United States Patent
Senneff et al.

(10) Patent No.: US 7,739,015 B2
(45) Date of Patent: Jun. 15, 2010

(54) SYSTEM AND METHOD FOR CONTROLLING A VEHICLE WITH A SEQUENCE OF VEHICLE EVENTS

(75) Inventors: Aaron Matthew Senneff, Ankeny, IA (US); Timothy J. Roszhart, Urbandale, IA (US); Peter Leslie Falck, Waterloo, IA (US); Michael J. Martin, Waterloo, IA (US); Brandon G. Leiran, Grimes, IA (US)

(73) Assignee: Deere & Company, Moline, IL (US)

( * ) Notice: Subject to any disclaimer, the term of this patent is extended or adjusted under 35 U.S.C. 154(b) by 263 days.

(21) Appl. No.: 11/831,824

(22) Filed: Jul. 31, 2007

(65) Prior Publication Data

US 2009/0037058 A1 Feb. 5, 2009

(51) Int. Cl.
*G06F 7/70* (2006.01)
(52) U.S. Cl. .......................... 701/50; 172/4.5
(58) Field of Classification Search .................... 701/50, 701/23, 26; 172/4.5; 340/988
See application file for complete search history.

(56) References Cited

U.S. PATENT DOCUMENTS

| | | | |
|---|---|---|---|
| 3,468,379 A | 9/1969 | Rushing et al. | |
| 3,606,933 A | 9/1971 | Rushing et al. | |
| 4,515,221 A | 5/1985 | van der Lely | |
| 4,518,044 A | 5/1985 | Wiegardt et al. | |
| 4,626,993 A | 12/1986 | Okuyama et al. | |
| 5,543,802 A | 8/1996 | Villevieille et al. | |
| 5,558,163 A | 9/1996 | Hollstein | |
| 5,606,850 A | 3/1997 | Nakamura | |
| 5,899,950 A | 5/1999 | Milender et al. | |
| 5,961,573 A * | 10/1999 | Hale et al. | 701/214 |
| 5,978,723 A | 11/1999 | Hale et al. | |
| 5,991,694 A | 11/1999 | Gudat et al. | |

(Continued)

FOREIGN PATENT DOCUMENTS

DE 102005008105 8/2006

(Continued)

OTHER PUBLICATIONS

Science fiction becomes farming fact. Profi Electronics, Precision Farming Event 2007, pp. 36-38, profi May 2007. Website: www.profi.co.uk.

(Continued)

*Primary Examiner*—Mark Hellner
(74) *Attorney, Agent, or Firm*—Foley & Lardner, LLP

(57) ABSTRACT

A system and method for controlling a vehicle with a sequence of vehicle events. A user interface allows the recording of vehicle functions that are being manually executed. After the vehicle functions are entered, they can be saved as a sequence and named appropriately. Once saved, the operator can choose to edit the sequence functions or distances to make adjustments or shift the entire sequence in time. The saved sequence can be executed at a certain distance relative to a boundary being crossed by the machine. The boundaries themselves may be pre-defined in the system, and the system can determine when the boundary is crossed based on real-time GPS position and speed measurements from the vehicle. Error distances can also be measured on the ground to determine what type of sequence shift is needed for fine-tuning. As the vehicle speed is adjusted, the sequence can be continually tuned to allow the sequence to execute accurately in a variety of operations.

19 Claims, 10 Drawing Sheets

U.S. PATENT DOCUMENTS

| | | |
|---|---|---|
| 6,085,134 A | 7/2000 | Adam |
| 6,128,574 A | 10/2000 | Diekhans |
| 6,336,051 B1 | 1/2002 | Pangels et al. |
| 6,345,231 B2 | 2/2002 | Quincke |
| 6,681,551 B1 | 1/2004 | Sheidler et al. |
| 6,907,336 B2 | 6/2005 | Gray et al. |
| 6,934,615 B2 | 8/2005 | Flann et al. |
| 6,990,399 B2 | 1/2006 | Hrazdera et al. |
| 7,010,425 B2 | 3/2006 | Gray et al. |
| 7,079,943 B2 | 7/2006 | Flann et al. |
| 7,110,881 B2 | 9/2006 | Gray et al. |
| 7,162,348 B2 | 1/2007 | McClure et al. |
| 7,216,033 B2 | 5/2007 | Flann et al. |
| 7,228,214 B2 | 6/2007 | Flann et al. |
| 7,502,678 B2 * | 3/2009 | Diekhans et al. ............... 701/50 |
| 2006/0142913 A1 | 6/2006 | Coffee et al. |
| 2006/0200294 A1 * | 9/2006 | Scheufler et al. ............... 701/50 |
| 2006/0237200 A1 | 10/2006 | Unruh et al. |

FOREIGN PATENT DOCUMENTS

| | | |
|---|---|---|
| EP | 0807373 | 11/1997 |
| EP | 1316868 | 6/2003 |
| WO | 98/21931 | 5/1998 |
| WO | 99/03035 | 1/1999 |

OTHER PUBLICATIONS

Harringa, Emily. Farming The Easy Way. Professional Surveyor Magazine. Mar. 2007.

* cited by examiner

FIG. 6

| Function | Sequence Learning | |
|---|---|---|
| | Initial Distance | "Flipped" Distance |
| Slow Down | 0 | 62 |
| Turn PTO OFF | -7 | 55 |
| Raise hitch | -35 | 27 |
| Diff Lock | -50 | 12 |
| APS | -62 | 0 |

SYSTEM AND METHOD FOR CONTROLLING A VEHICLE WITH A SEQUENCE OF VEHICLE EVENTS

FIELD OF THE INVENTION

The present invention relates generally to the field of agricultural equipment. More particularly, the present invention relates to the use of agricultural equipment in planting, harvesting and other operations.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Conventional agricultural combines include a header leading the combine, having a forward gathering portion and a feederhouse portion which contains elements for processing crop material and/or transferring the crop material from the gathering portion to the body of the combine. In the body of the combine, the grain is separated from the chaff and straw, collected, and thereafter unloaded via an auger. Such combines have a variety of designs.

When pulling into or out of headlands with a machine, there are several activities that need to occur in rapid succession. These activities include, but are not limited to, raising and/or lowering an implement, raising and/or lowering a hitch, extending or retracting marker arms, turn power take-off shaft (PTO) on or off, turning a planter on and/or off, changing ground speed, etc. These activities are both tedious and repetitive, yet these tasks need to be performed frequently, and often before and after each turn. Furthermore, these operations are manual operations which are prone to inaccuracies due to the timing of the operator and the time required to perform each operation.

Although a number of systems exist that permit an operator to initiate the "automatic" playback of functions by pushing a button or actuating a similar mechanism, the operator is still required to determine on his or her own when to hit the button. Often, the operator must make this decision by watching to see when a boundary is crossed or is being approached. However, field boundaries are often difficult to identify due to dust or other factors, making it difficult to know precisely when certain operations should be performed or when a button should be pushed to begin an automated process. In fact, it has been observed that button push timing variation has a standard deviation of almost 200 msec. This amount of variation does not allow for precision work (i.e., in the range of +/−30") at typical planting speeds (about 4-7 mph) and therefore would result in errors exceeding +/−4 ft at these speeds.

SUMMARY OF THE INVENTION

Various embodiments provide a system and method for controlling a vehicle with a sequence of vehicle events. A user interface is used to permit the recording of vehicle functions that are being executed manually. The operator sets the system of the various embodiments to record, and then executes all of the operations in the cab that he would normally perform. The functions can be entered into the system in various ways. For example, functions can be recorded while they are manually performed. After recording functions and distances, the list of functions can be saved as a sequence with an appropriate title. If the operator desires to set up a sequence of functions without performing them manually, the operator can select from the available functions to perform and enter in a distance value on the user interface relative to a boundary. After the set of functions are entered, they can be saved as a sequence with an appropriate title. Once saved, the operator can choose to edit the sequence functions or distances to make fine adjustments or to shift the entire sequence to execute earlier or later. The saved sequence can be executed at a certain distance relative to a boundary being crossed by the machine. The boundaries themselves may be pre-defined in the system, and the system can determine when the boundary is crossed based on real-time GPS position and speed measurements from the vehicle. After running the system for a few rounds, the operator can measure error distances on the ground in order to determine what type of sequence shift is needed for fine-tuning. As the vehicle speed is adjusted, the sequence can be continually tuned to allow the sequence to execute accurately in a variety of operations.

These and other features of the invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 6 shows how a sequence setup learning mode may be used in accordance with various embodiments;

DETAILED DESCRIPTION OF VARIOUS EMBODIMENTS

Figure 1:
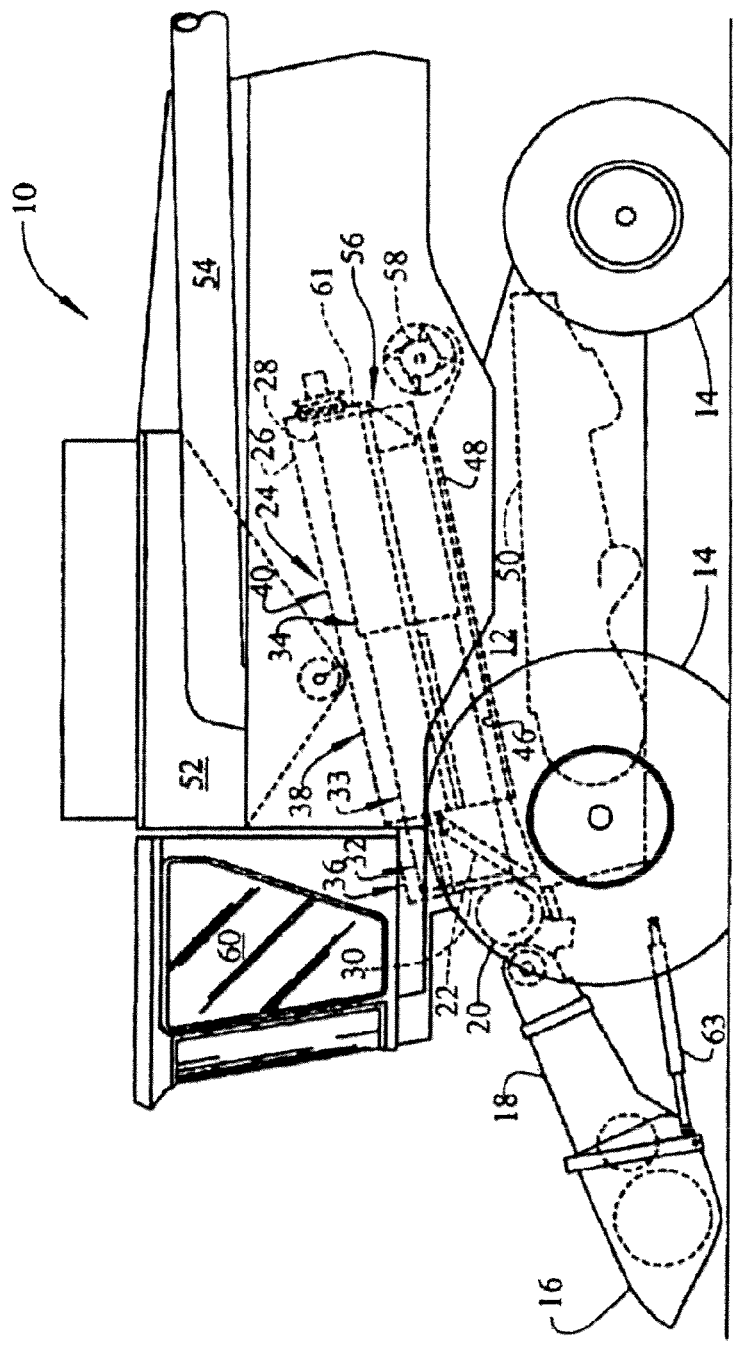
FIG. 1 is a side view of an exemplary agricultural combine which is capable of incorporating a control system in accordance with various embodiments of the present invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIG. 1 shows an example agricultural combine 10 of the type incorporating an axial rotary crop-processing unit. The combine 10 comprises a supporting structure or chassis 12 mounting a ground engaging mechanism 14 shown in the form of tires. Alternatively, tracks can be used in place of tires. A harvesting platform 16 is used for harvesting a crop and directing the crop to a feederhouse 18. The harvested crop is directed by the feederhouse 18 to a beater 20. The beater directs the crop upwardly to a rotary crop-processing unit 24. The rotary crop-processing unit is located between the side sheets of the combine. The side sheets form part of the supporting structure 12.

The rotary crop-processing unit 24 comprises a rotor housing 26 and a rotor 28 located within the housing. The harvested crop enters the housing through an inlet 22 at the inlet end 30 of the housing 26. The rotor is provided with an inlet feed portion 32, a threshing portion 33, and a separating portion 34. The rotor housing has a corresponding infeed section 36, a threshing section 38, and a separating section 40.

Both the threshing portion 33 and the separating portion 34 of the rotor are provided with crop engaging members (not shown). The threshing section 38 of the housing is provided with a concave 46 while the separating section 40 of the housing is provided with a grate 48. Grain and chaff released from the crop mat fall through the concave 46 and grate 48. The concave and the grate prevent the passage of crop material larger than grain or chaff from entering the combine cleaning system 50 below the rotary crop-processing unit 24.

Grain and chaff falling through the concave and grate is directed to the cleaning system 50 that removes the chaff from the grain. The clean grain is then directed by an elevator (not shown) to clean grain tank 52 where it can be directed to a truck or grain cart by unloading the auger 54. Straw that reaches the end 61 of the housing is expelled through an outlet 56 to a beater 58. The beater propels the straw out the rear of the combine. The end 61 is thus the outlet end of the housing. The crop material moves through the rotary crop-processing unit in a crop flow direction from the inlet end 30 to the outlet end 61 of the housing. The operation of the combine is controlled from the operator cab 60.

The header 16 can be lifted by use of lift cylinders 63. The auger 54 can be pivoted via a cylinder or motor (not shown) about a vertical axis between an inboard orientation shown and an outboard orientation, substantially perpendicular to the traveling direction of the combine, to offload grain to a body of a truck. The auger can be pivoted inboard, substantially parallel to the direction of travel of the combine when not in use.

In addition to the vehicle depicted in FIG. 1, it should be noted that the various embodiments of the present invention may be used with a tractor that pulls an implement via a hitch, with the implement being typically powered by a tractor's PTO that is coupled to the implement. For example, various embodiments may operate in conjunction with a tractor that can raise or lower a hitch, retract a hitch, and change the speed, direction, or the on/off status of the PTO. The implement may comprise, for example, a planter, a cultivator, a pull-behind mower, a planter or seeding apparatus, a scraper (for leveling land or making roads, or irrigation or drainage channels), a digger or trencher (e.g., for laying drain tile), or other agricultural or construction equipment.

Various embodiments provide a system and method for controlling a vehicle with a sequence of vehicle events. According to various embodiments, a display interface is used by an operator, permitting the recording of vehicle functions that are being executed manually by the operator. According to various embodiments, the operator can set the system to record the vehicle's operations. Once the system is appropriately set, the operator can then execute all of the operations in the cab that he would normally perform.

The individual functions can be entered into the system in different ways. In one embodiment, the functions can be recorded while the operator is manually conducting the operations. After the system records relevant functions implemented by the operator and distances traveled, the operator can save the list of functions as a sequence. The user can also provide an appropriate title or text name describing the sequence, with a title such as "raise planter," for example. In the event that the operator wants to set up a sequence of functions without performing them manually, the operator can choose from the available functions and enter distance values on the user interface, with the distances being relative to a boundary. After the set of functions are entered, they can be saved as a sequence, again using text names or titles such as "raise planter."

Once saved, the operator can choose to edit the sequence functions or distances in order to make fine adjustments or to shift the entire sequence to execute at an earlier or later time. Using this functionality, a sequence can still be usable to the operator, even if the sequence wasn't initially set up exactly right. The saved sequence can be executed at a certain distance relative to a boundary being crossed by the machine. The boundaries themselves can be pre-defined in the system, and the system can determine when the boundary is crossed based on real-time GPS position and speed measurements from the vehicle, for example. In this environment, for example, a planter can raise automatically after passing through a boundary. After running the system for a number of "rounds," the operator can measure error distances on the ground in order to determine what type of sequence shift is needed for fine-tuning. As the vehicle speed is adjusted, the sequence can be continually tuned to allow the sequence to execute accurately in a variety of operations.

Figure 2:
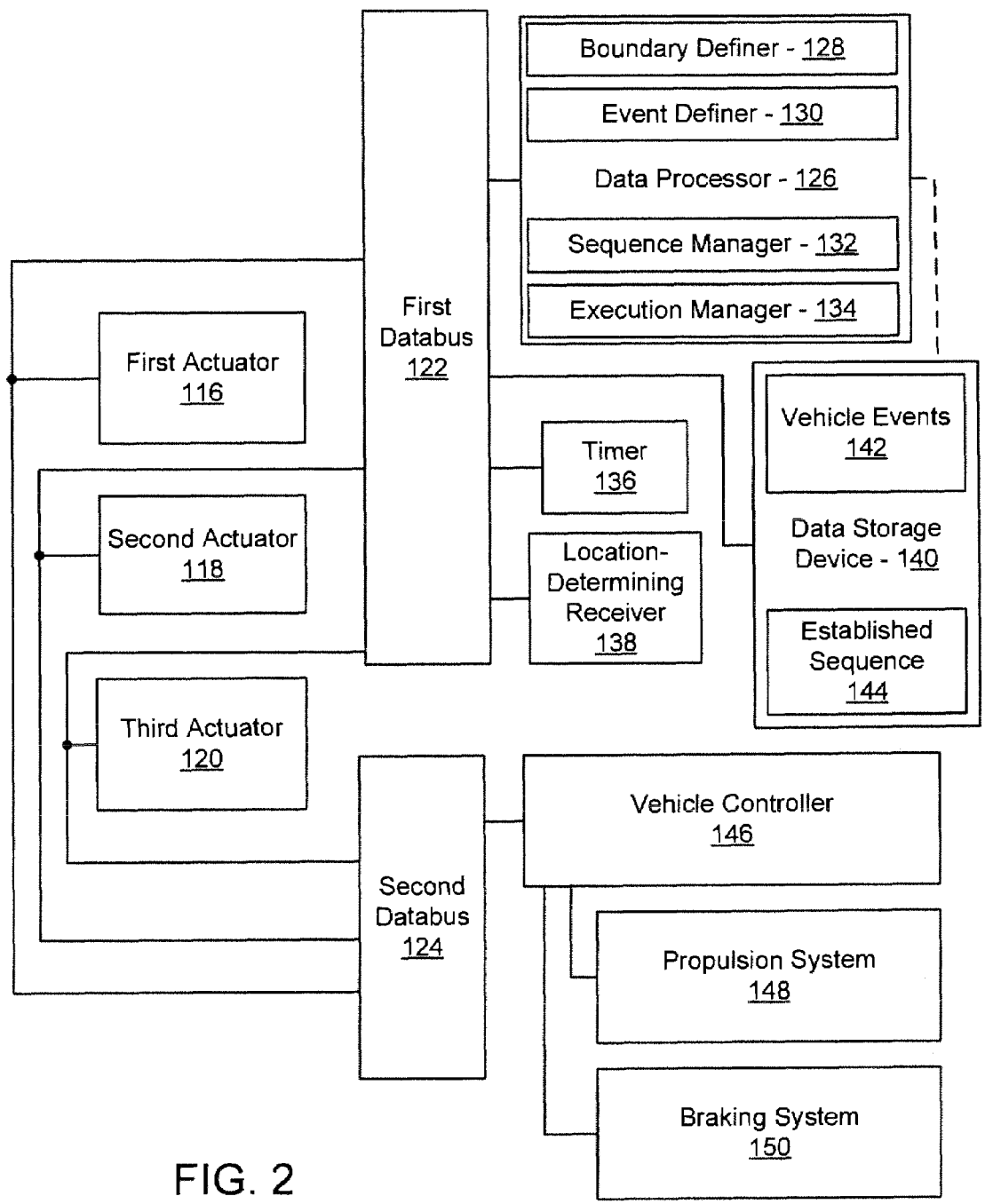
FIG. 2 is a schematic diagram of a system by which a sequence of vehicle events can be controlled according to a first embodiment of the present invention.
Figure 3:
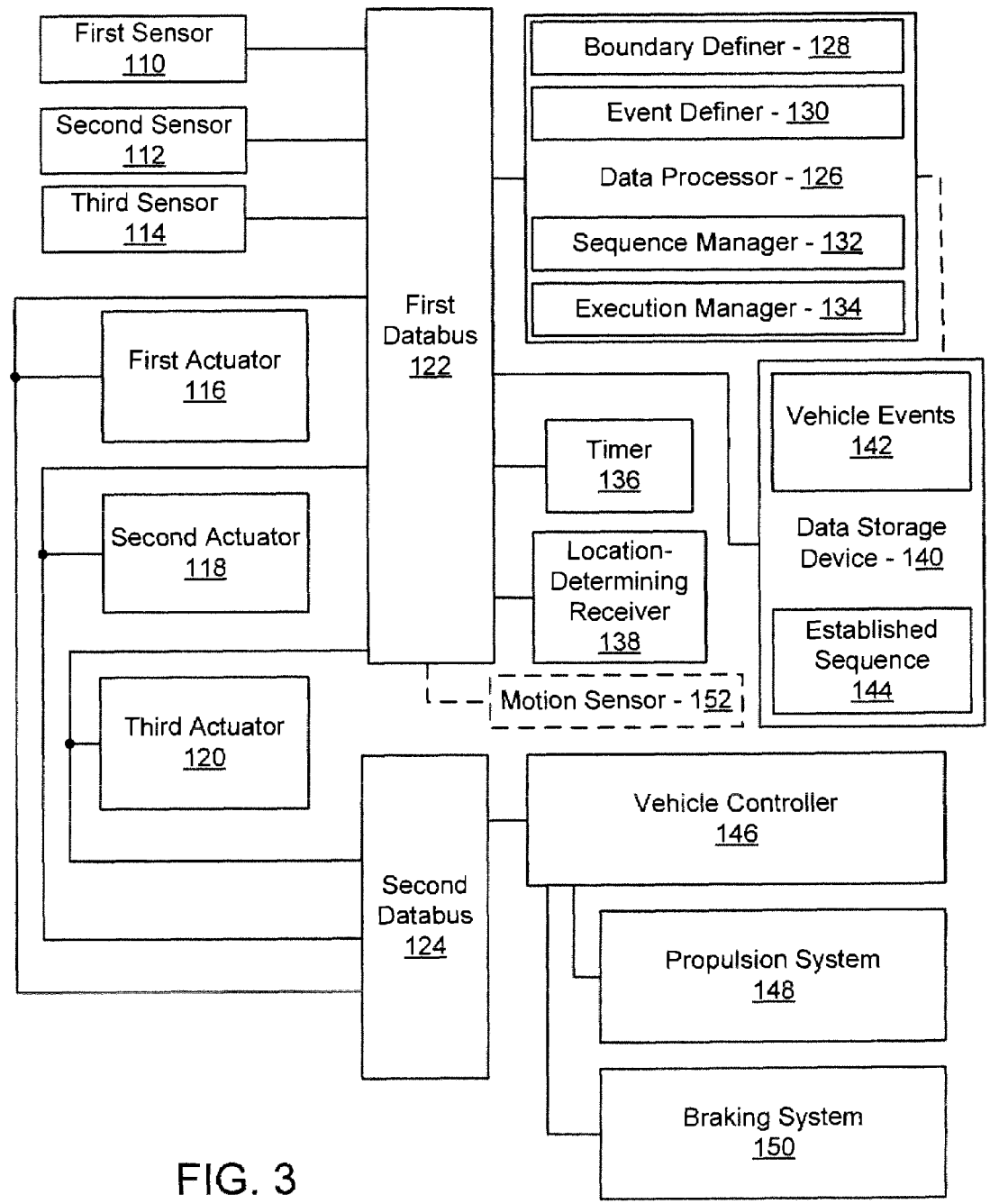
FIG. 3 is a schematic diagram of a system by which a sequence of vehicle events can be controlled according to a second embodiment of the present invention.

FIGS. 2 and 3 are schematic diagrams of systems by which a sequence of vehicle events can be controlled according to different embodiments of the present invention. In both FIGS. 2 and 3, a data storage device 140 such as a computer memory can save information such as vehicle events 142 and established sequences 144. The data storage unit 140 is communicatively connected to a data processor 126. The data processor 126 can implement various programs, routines, subroutines etc. For example, the data processor can implement a boundary definer 128, an event definer 130, a sequence manager 132 (which may include a sequence definer, sequence editor, etc.), and an execution manager 134, with the execution manager performing functions such as adjusting speeds and compensating for changes in function.

In the systems of FIGS. 2 and 3, the data processor 126 is communicatively connected to a first databus 122. Other items which may be connected in some form to the first databus 122 include a timer 136 and a location-determining receiver 138. The location-determining receiver may comprise, for example, a Global Positioning System (GPS) receiver. In the system of FIG. 3, a motion sensor 152 may also be communicatively connected to the first databus 122. The motion sensor 152 may comprise, for example, a velocity sensor and/or an accelerometer. A first sensor 110, a second sensor 112 and a third sensor 114 may also be operatively connected to the first databus 122, with these sensors comprising, for example, implement height sensors, hitch position sensors, power take-off shaft sensors, RPM sensors, etc.

The first databus 122 can transfer data from any of these components to one of a plurality of actuators. In FIGS. 2 and 3, a first actuator 116, a second actuator 118 and a third actuator are shown. These actuators may comprise, for example, implement actuators, hitch actuators, power take-off actuators, etc. Each of the first, second and third actuators 116, 118 and 120 may in turn be communicatively connected to a second databus 124, which transfer data to a vehicle controller 146 and ultimately the vehicle's propulsion system 148, braking system 150, and other systems of the vehicle that are known in the art.

Figure 4:
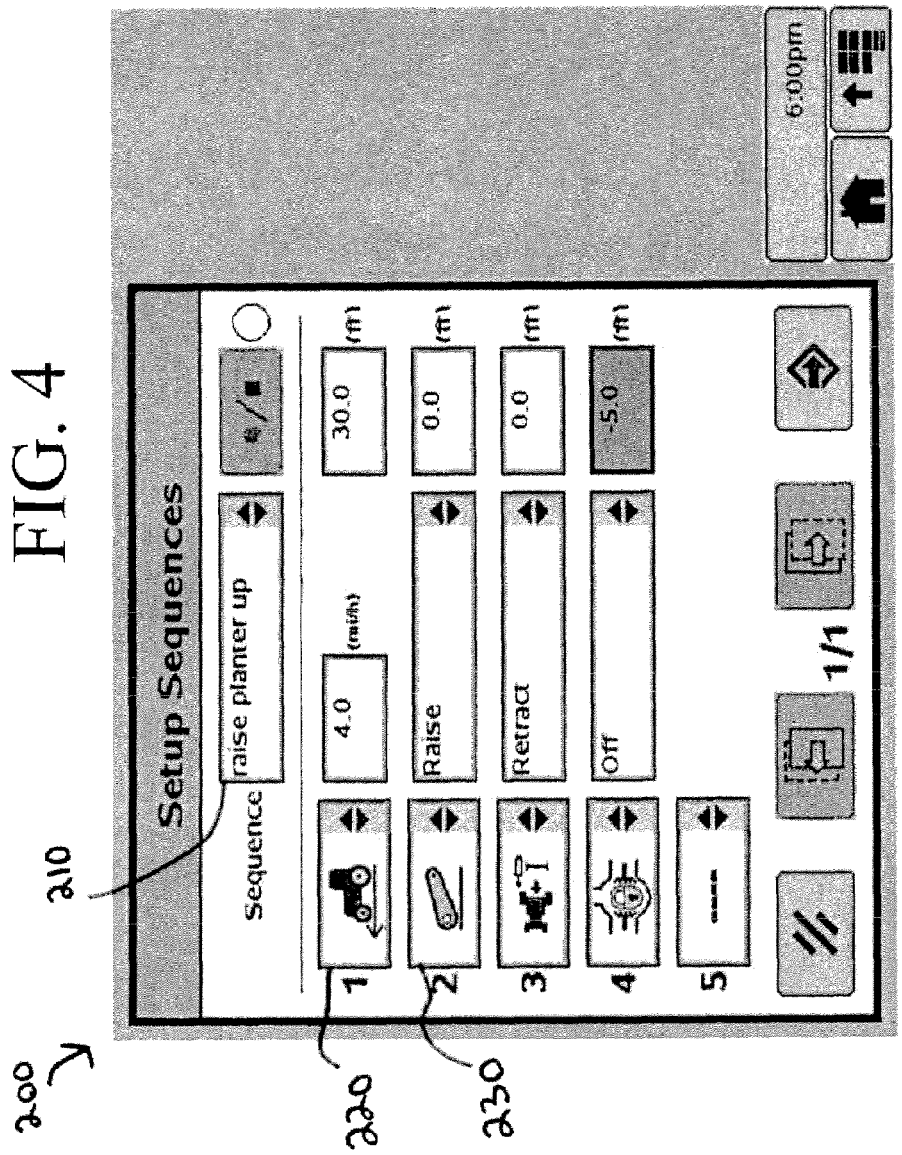
FIG. 4 is a representation of a display interface through which various embodiments may be implemented, showing a sequence setup editing mode.

FIGS. 4, 5, 7 and 8 show a display interface 200 through which various embodiments may be implemented. FIG. 4 shows a sequence setup (edit) mode, via which various functions may be entered into the system and modified accordingly. For example, the display interface 200 in FIG. 4 includes a sequence box 210, with the sequence box 210 showing the title of the sequence being edited (the "raise planter up" sequence in this case). A number of vehicle events are then depicted, along with information concerning what is to occur at each vehicle event and at what point the vehicle event is to occur. This sequence editing screen allows the functions and distances to be edited easily with an intuitive pictorial interface. In the arrangement shown in FIG. 4, the first vehicle event that is to occur in the sequence is listed at the top, with subsequent events appearing in order therebelow. For example, the first vehicle event to occur in the "raise planter up" sequence is a "vehicle speed" event 220, with an indication that the vehicle is to move at 4.0 miles per hour, and that the event is to be initiated 30 feet from the end of the sequence. The next event is a "raise planter" event 230, with the planter being raised once the vehicle speed is set at 4.0 miles per hour. Other events are then shown sequentially. The vehicle events that may be used include, but are not limited to, lowering an implement, raising an implement, lowering a hitch, raising a hitch, retracting a hitch, lowering a planter, raising a planter, lowering a cultivator, raising a cultivator, changing a speed of a power take-off shaft, increasing a speed of a shaft, decreasing a speed of a shaft, reducing a ground speed of a vehicle, increasing a ground speed of a vehicle, engaging or disengaging a limited slip differential, engaging a brake or a braking system of the vehicle, and controlling a vehicular steering system.

The vehicle events, as well as the actions related to the events and the locations where the events are to occur, can be edited by the operator as needed or desired. Such sequence adjustments permit the sequences to occur more accurately at a variety of vehicle speeds and situations. As discussed above, the operator is capable of creating a sequence from scratch without operating the vehicle at all, or the user can record vehicle activity and have the activity saved as a sequence, which is beneficial for complex sequences which may not be amenable to creating by recording the vehicle's activities For example, the operator can setup a sequence to turn a differential lock off, raise the planter marker arms, and then slow down for a very short distance while the planter itself is being raised, after which the vehicle can speed up again to make an efficient end-turn. This type of sequence would be very difficult to set up if recording were the only manner to create the proper sequence of functions.

Figure 5:
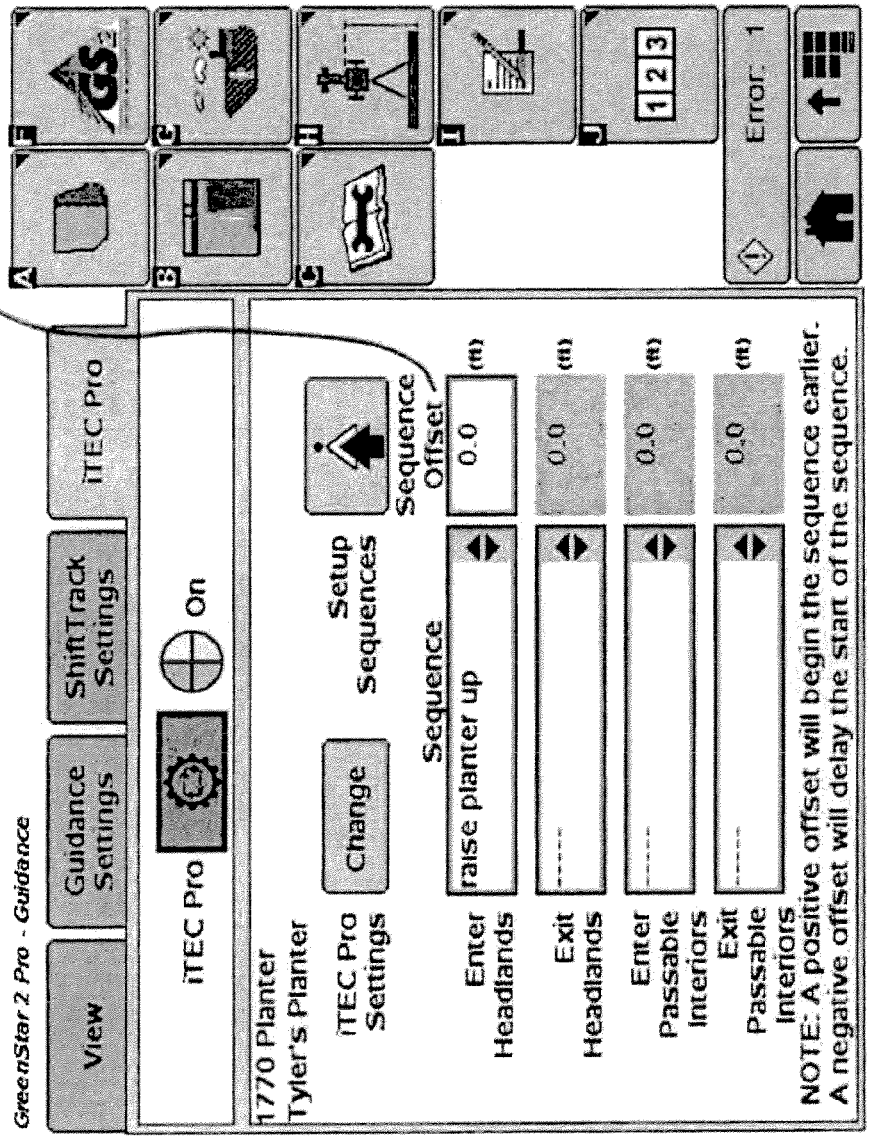
FIG. 5 shows the display interface of FIG. 4, whereby a user is capable of shifting a sequence of events with respect to crossing a boundary.

FIG. 5 shows how individual sequences can be adjusted or shifted in their entirety by the operator. As shown in FIG. 5, individual sequences can be set to initiate at certain times. For example, in the arrangement of FIG. 5, the "raise planter up" sequence is set to initiate in response to the vehicle entering headlands. In addition, the user can also use a "sequence offset" feature 240 in order to shift this sequence and others to an earlier or later time. For example, if the operator were to adjust the sequence offset for the "raise planter up" feature to 20 feet, then this sequence would not start until the vehicle had crossed the headlands boundary and had moved 20 feet after entering the headlands.

Figure 7:
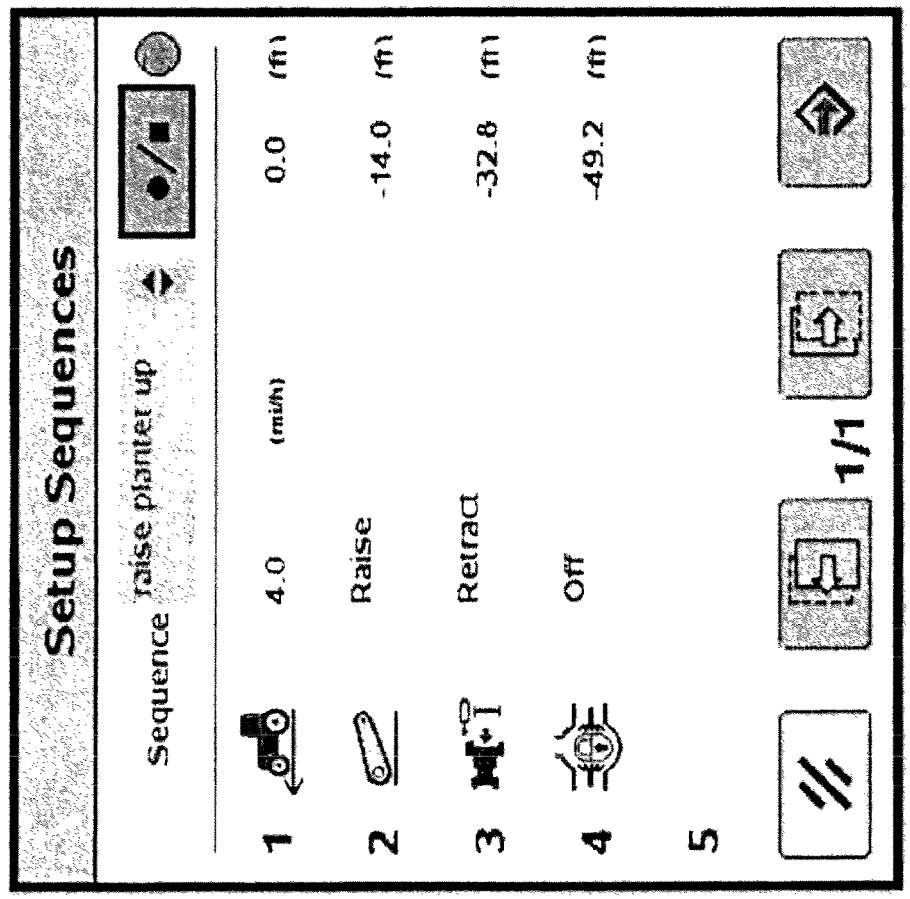
FIG. 7 shows the display interface of FIG. 4 while the learning process is in process.
Figure 8:
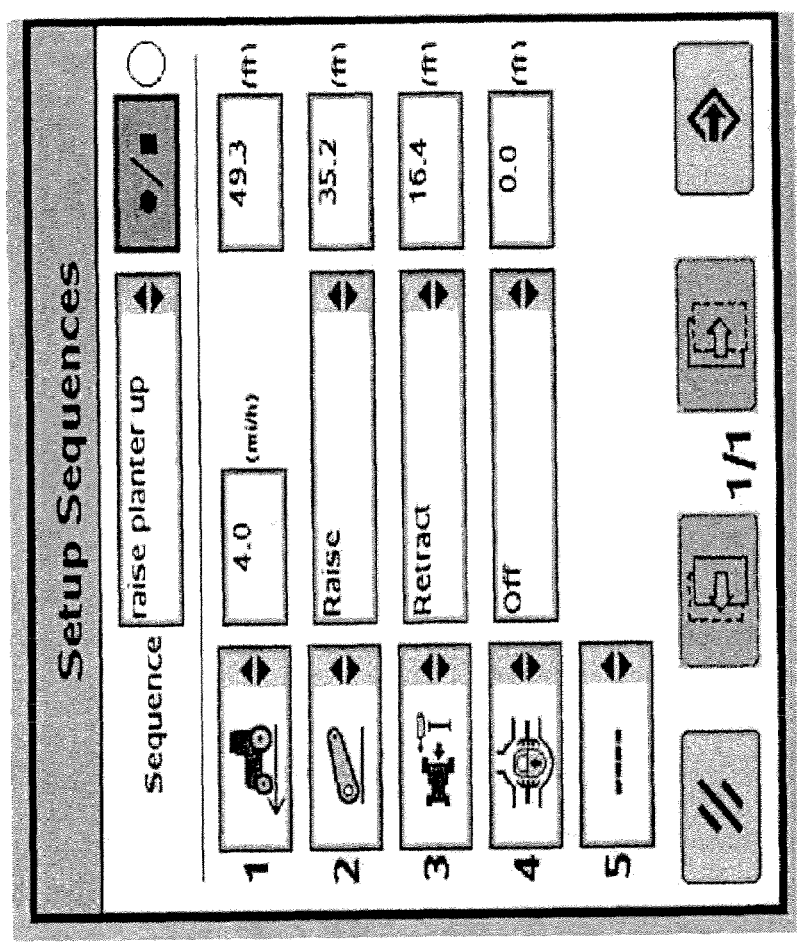
FIG. 8 shows the display interface of FIG. 4 after the learning process has been conducted.

FIG. 6 shows how the system of various embodiments of the present invention can "learn" the details of a sequence during a recording process. Sequence recording allows the sequence to be created while the operator is performing the functions in normal use. Because the sequences can be edited at a later time, 100% accuracy by the operator may not be critical during an initial recording process, thereby making the system more forgiving and more robust from the customer's perspective. During the learning process, individual functions are listed in the order of occurrence, with the first function appearing first. Additionally, the distances from the appropriate boundary is also listed. For example, the "Turn PTO off" function occurs at 7 feet after the boundary was crossed, the "Raise Hitch" function occurs 35 feet after the boundary was crossed, etc.) The sequence is then "flipped" for storage and later use. In the "flipping" procedure, the last item that occurs has its distance set to zero, and all of the original distances are subtracted from largest original distance to derive new distances. FIGS. 7 and 8 show the learning mode and flipping of the sequence on the user interface 200. For each of the individual functions, the order of execution and the distance between functions is always maintained.

Figure 9:
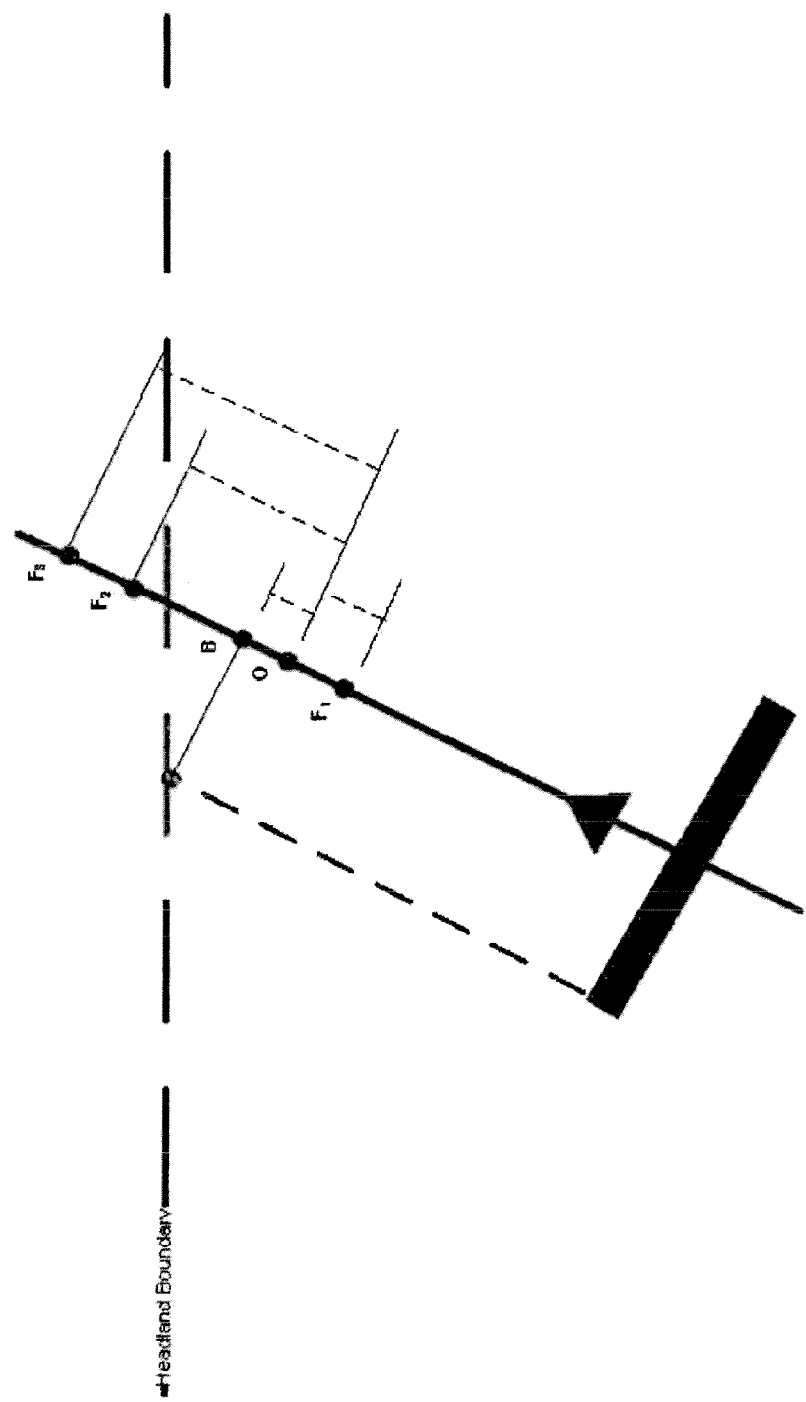
FIG. 9 is a representation showing various distances involved in relation to a headland boundary, and how such distances are used in sequence determination and implementation.

FIG. 9 is a representation showing various distances involved in relation to a headland boundary, and how such distances are used in sequence determination and implementation. As shown in FIG. 9, the sequence begins running at point 0. Point B is the point where an implement on a vehicle intersects the headland boundary. The precise location of point B is based on the dimensions of the implement at issue and any skip/overlap setting. Any boundary alerts that may be provided are based off of the time to point B.

The distance from point B to point 0 is the boundary offset. In this measurement, a positive distance value moves the start of the sequence in the opposite direction relative to the travel of the vehicle. For example, a negative vehicle moves in line with the vehicle's direction. The distance from point $F_1$ to point 0 is the distance for the first function in the sequence relative to point zero. The sign convention is the same as for the boundary offset. For this reason, the distance is negative in FIG. 9. In contrast, the distances from points $F_2$ to 0 and $F_3$ to 0 are negative, as they are in the direction of the vehicle. The distance from point $F_2$ to point 0 is the distance for the second function in the sequence relative to point zero, and the distance from point $F_3$ to point 0 is the distance for the third function in the sequence relative to point zero.

Figure 10:
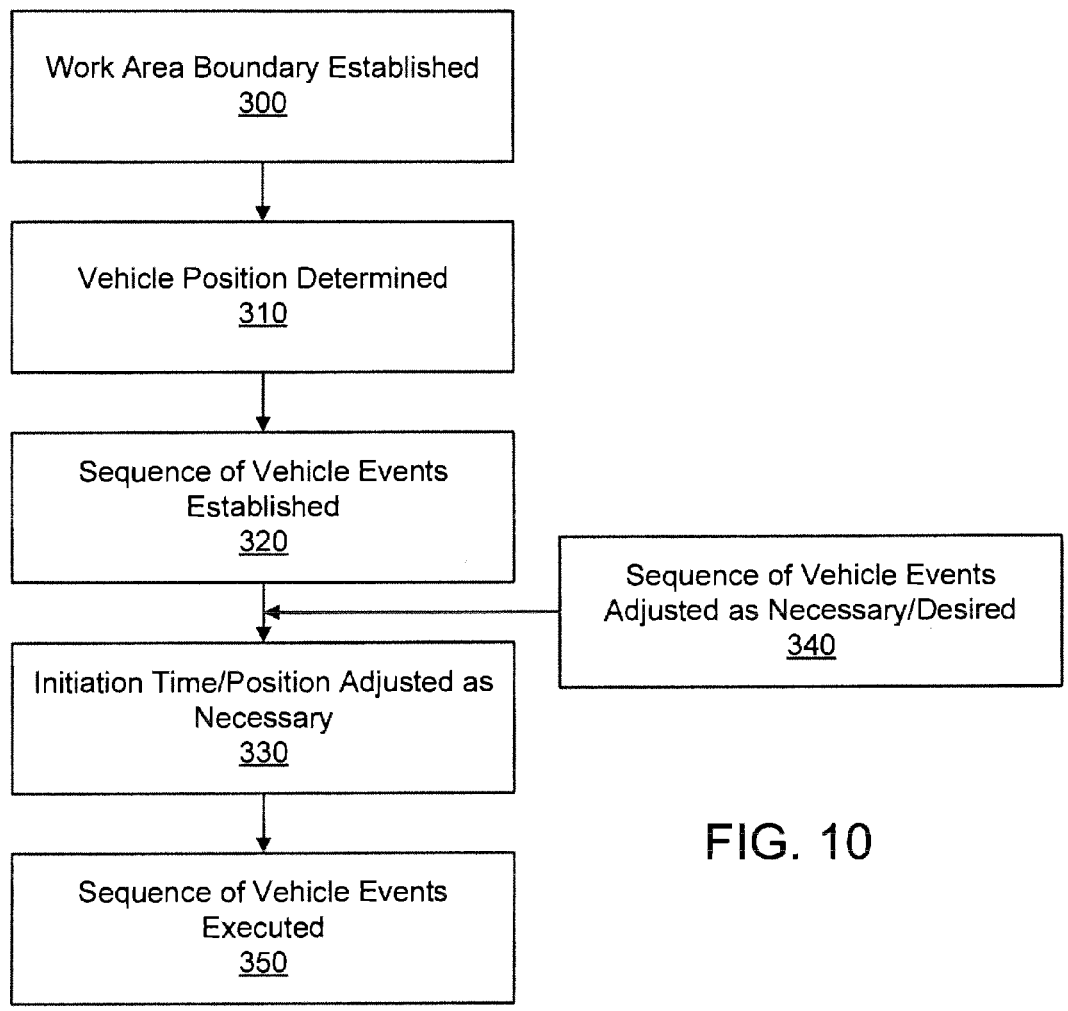
FIG. 10 is a flow chart showing a process by which various embodiments of the present invention may be implemented.

Various embodiments of the present invention can be used to control a vehicle as follows and as depicted in FIG. 10. According to these embodiments, after a boundary of a work area is established at 300, a position of a vehicle can be determined at 310 via a location-determining receiver such as a GPS system. The establishing of the boundary may comprise, for example, establishing an interior passable boundary within the work area where the sequence comprises at least decreasing an operational ground speed of the vehicle within a certain spatial range of approaching the interior passable boundary at a first initiation time or initiation position, and raising an implement associated with the vehicle at a second initiation time or initiation position.

At 320, a sequence of vehicle events to be executed if the determined position traverses the boundary or approaches the boundary by less than a critical distance from the boundary is established. The sequence of vehicle events may established by recording the vehicle events at a target speed. Alternatively, the sequence of vehicle events may be established by recording manual operations executed by the operator via sensors or actuators associated with at least one of the vehicle and an implement attached to the vehicle. The establishing of the sequence of vehicle events may also comprise pre-establishing a non-editable sequence of the vehicular events as a pre-programmed or factory setting for a corresponding particular implement.

Each vehicle event, which may include one or more implement events, is associated with a corresponding initiation time or an initiation position with reference to the boundary, and the sequence is associated with a corresponding particular target ground speed or target ground speed range. At 330, the initiation time or the initiation position of one or more vehicle events is adjusted by a corrective offset if the actual vehicular speed falls outside of the target ground or target ground speed range. The corrective offset may be based, for example, on a detected ground speed and a detected deceleration/acceleration of the vehicle detected between the critical distance and a buffer boundary, with the buffer boundary being closer to the vehicle than the established boundary and prior to at least a last one of the vehicle events in the sequence. At 340, the sequence of vehicle events may be modified if necessary or desired in order to add a vehicle event to the sequence or to delete a vehicle event from the sequence. At 350, the sequence of vehicular events are executed. These events may be executed at an execution speed within a target speed range, at a speed that exceeds a target speed, or at another speed.

With regard to the above process, the sequence of vehicle events may comprise, for example (1) adjusting an operational ground speed of the vehicle to the target ground speed prior to reaching the boundary at a first initiation time or first initiation position; (2) deactivating a power takeoff shaft at a second initiation time or second initiation position; and (3) raising a hitch associated with an implement at a third initiation time or a third initiation position. This process may also include deactivating a limited slip differential or four wheel drive mode at a fourth initiation time or fourth initiation position, and engaging the vehicle in a turn at a fifth initiation time or a fifth initiation position after the vehicle is operating at the target ground speed, wherein the power takeoff shaft is deactivated and the hitch is raised.

In the case where the actual speed range does not equal the target speed range and a corrective offset is determined, a GPS system can provide the position (e.g., coordinates), velocity and acceleration of the vehicle. A motion sensor may also provide the velocity and acceleration information. The corrective offset is based on the position, velocity and acceleration of the vehicle prior to reaching the boundary (e.g., upon approaching the boundary by a threshold spatial range). The corrective offset may be determined in distance measurement units (for application to initiation position) or time measurement units (for application to initiation time).

The corrective offset may be determined by a GPS system or motion sensor in terms a number of the following: detected position (x), detected time (t), detected velocity (v), and detected acceleration (a) of the vehicle. Velocity is the first derivative of position or the rate of change in the position of the vehicle. Acceleration is the second derivative of position and the first derivative of velocity or the rate of change of velocity. For these variables, the following equations apply, where a constant acceleration holds:

$$x = vt \quad (1)$$

$$y = \frac{v_o + v}{2} \quad (2)$$

$$v = v_0 + at \quad (3)$$

$$x = v_0 + \frac{(at^2)}{2} \quad (4)$$

$$v = \sqrt{v_0^2 + 2ax} \quad (5)$$

In the above, x is the distance traveled from the initial state to the final state (displacement), $v_0$ is the initial speed, v is the final speed, a is a constant acceleration, and t is the time taken from move from the initial state to the final state. In one embodiment, the acceleration term in equations (3)-(5) can be adjusted when the acceleration is not constant such that a is replaced with $a_{adjusted}$. The adjustment to the acceleration may include one or more of the following factors: the acceleration profile of the particular vehicle, the load or weight of any implement pulled, pushed or carried by the vehicle, moisture content of the ground, composition of the ground material (e.g., clay, loam, silt, sand, gravel, topsoil, crushed rock, etc.), wheel diameter, tire size, engine size, engine horsepower rating, vehicle acceleration profile (e.g., under full, partial throttle, or steady throttle position), braking system efficiency, braking system rating and deceleration profile.

In addition, differential equations may be used to model the operation of the vehicle to estimate the corrective offset instead of using the above adjustments to the acceleration. However, for heavy vehicles under heavy loads that are towing heavy implements, an assumption of constant acceleration with the above equations will often suffice. In an alternate embodiment, the engine controller may be controlled to follow a desired acceleration or deceleration curve, and/or the braking system may be pulsed or controlled to follow a desired deceleration curve, which is consistent with at least one of the motion equations, differential equations or motion equations with adjusted acceleration.

The various embodiments of the present invention described herein is described in the general context of method steps or processes, which may be implemented in one embodiment by a computer program product, embodied in a computer-readable medium, including computer-executable instructions, such as program code, executed by computers in networked environments. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Software and web implementations of various embodiments of the present invention can be accomplished with standard programming techniques with rule-based logic and other logic to accomplish various database searching steps or processes, correlation steps or processes, comparison steps or processes and decision steps or processes. It should be noted that the words "component" and "module," as used herein and in the following claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described to explain the principles of the present invention and its practical application to enable one skilled in the art to utilize the present invention in various embodiments and with various modifications as are suited to the particular use contemplated.

What is claimed is:

1. A method for controlling a vehicle, comprising:
   establishing a boundary of a work area;
   determining a position of a vehicle via a location-determining receiver;
   establishing a sequence of vehicle events to be executed if the determined position approaches the boundary by less than a critical distance from the boundary, each vehicle event associated with a corresponding initiation time or an initiation position with reference to the boundary, the sequence associated with a corresponding particular target ground speed or target ground speed range; and adjusting the initiation time or the initiation position of one or more vehicle events by a corrective offset if the actual vehicular speed falls outside of the target ground or target ground speed range.

2. The method of claim 1, wherein the corrective offset is based on a detected ground speed and a detected deceleration/acceleration of the vehicle detected between the critical distance and a buffer boundary, the buffer boundary being closer to the vehicle than the established boundary and prior to at least a last one of the vehicle events in the sequence.

3. The method of claim 1, further comprising modifying the sequence of vehicle events to add a vehicle event to the sequence or to delete a vehicle event from the sequence.

4. The method of claim 1, wherein at least one vehicle event comprises an implement event.

5. The method of claim 1, wherein the vehicle events comprise at least one of lowering an implement, raising an implement, lowering a hitch, raising a hitch, retracting a hitch, lowering a planter, raising a planter, lowering a cultivator, raising a cultivator, changing a speed of a power take-off shaft, increasing a speed of a shaft, decreasing a speed of a shaft, reducing a ground speed of a vehicle, increasing a ground speed of a vehicle, engaging or disengaging a limited slip differential, engaging a brake or a braking system of the vehicle, and controlling a vehicular steering system.

6. The method of claim 1, wherein the sequence of vehicle events are established by recording the vehicle events at the target speed, and further comprising executing the vehicle events at an execution speed that exceeds the target speed.

7. The method of claim 1, wherein the sequence of vehicle events are established by recording the vehicle events within a target speed range, and further comprising executing the vehicular events at an execution speed within the target speed range.

8. The method of claim 7, further comprising reducing a ground speed of the vehicle to the target speed range prior to reaching the boundary upon approaching the boundary by a threshold spatial range.

9. The method of claim 7, further comprising maintaining a ground speed of the vehicle within the target speed range during operation of the vehicle and prior to reaching the boundary.

10. The method of claim 1, wherein the sequence of vehicle events are established by recording manual operations executed by the operator via sensors associated with at least one of the vehicle and an implement attached to the vehicle.

11. The method of claim 1, wherein the sequence of vehicle events are established by recording manual operations executed by the operator via actuators associated with at least one of the vehicle and the implement attached to the vehicle.

12. The method of claim 1, wherein the establishing of the sequence of vehicle events comprises pre-establishing a non-editable sequence of the vehicular events as a pre-programmed or factory setting for a corresponding particular implement.

13. The method of claim 12, wherein each implement is assigned a target speed range.

14. The method of claim 1, wherein the sequence of vehicle events comprises:
adjusting an operational ground speed of the vehicle to the target ground speed prior to reaching the boundary at a first initiation time or first initiation position;
deactivating a power takeoff shaft at a second initiation time or second initiation position; and
raising a hitch associated with an implement at a third initiation time or a third initiation position.

15. The method of claim 14, further comprising:
deactivating a limited slip differential at a fourth initiation time or fourth initiation position; and
engaging the vehicle in a turn at a fifth initiation time or a fifth initiation position after the vehicle is operating at the target ground speed, and wherein the power takeoff shaft is deactivated and the hitch is raised.

16. The method of claim 14, further comprising:
deactivating a four wheel drive mode at a fourth initiation time or a fourth initiation position; and
engaging the vehicle in a turn at a fifth initiation time or a fifth initiation position after the vehicle is operating at the target ground speed, and wherein the power takeoff shaft is deactivated and the hitch is raised.

17. The method of claim 14, further comprising shifting a transmission of the vehicle from a current gear ratio to a different gear ratio associated with the propulsion of the vehicle.

18. The method of claim 1, wherein the establishing of the boundary comprises:
establishing an interior passable boundary within the work area where the sequence comprises at least decreasing an operational ground speed of the vehicle within a certain spatial range of approaching the interior passable boundary at a first initiation time or initiation position; and
raising an implement associated with the vehicle at a second initiation time or initiation position.

19. A method for controlling a vehicle, comprising:
establishing a boundary of a work area;
determining a position of a vehicle via a location-determining receiver;
establishing a sequence of vehicle events to be executed if the determined position approaches the boundary by less than a critical distance from the boundary, each vehicle event associated with a corresponding initiation time or an initiation position, the sequence associated with a corresponding particular ground speed or ground speed range; and
adjusting the vehicular speed to attain the target ground speed or the target ground speed range if the actual vehicular speed falls outside of the ground speed range for execution of the sequence.

* * * * *